United States Patent
Moore et al.

(10) Patent No.: US 11,769,224 B2
(45) Date of Patent: Sep. 26, 2023

(54) MITIGATING TRANSITIONS IN MOSAIC IMAGES

(71) Applicant: Raytheon Company, Waltham, MA (US)

(72) Inventors: Jerry O. Moore, Wylie, TX (US); Matthew A. Schaefer, Rowlett, TX (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 17/225,566

(22) Filed: Apr. 8, 2021

(65) Prior Publication Data

US 2022/0327659 A1    Oct. 13, 2022

(51) Int. Cl.
*G06T 3/40*    (2006.01)
*G06T 7/70*    (2017.01)
*G06T 5/40*    (2006.01)

(52) U.S. Cl.
CPC .............. *G06T 3/4038* (2013.01); *G06T 5/40* (2013.01); *G06T 7/70* (2017.01)

(58) Field of Classification Search
CPC ......... G06T 5/40; G06T 5/50; G06T 2200/32; G06T 2207/10032; G06T 2207/20212;
(Continued)

(56) References Cited

U.S. PATENT DOCUMENTS

| 6,097,854 A | 8/2000 | Szeliski et al. |
| 6,157,747 A | 12/2000 | Szeliski et al. |

(Continued)

FOREIGN PATENT DOCUMENTS

| CN | 105976325 A | * | 9/2016 | ........... G06T 11/001 |
| CN | 106856000 A | * | 6/2017 | ........... G06T 3/4038 |

(Continued)

OTHER PUBLICATIONS

"U.S. Appl. No. 16/674,868, Notice of Allowance dated Apr. 7, 2021", 8 pgs.

(Continued)

*Primary Examiner* — Ian L Lemieux
*Assistant Examiner* — Woo C Rhim
(74) *Attorney, Agent, or Firm* — Schwegman Lundberg & Woessner, P.A.

(57) ABSTRACT

A system mitigates transitions among pixels a mosaic image. The system uses two balancing adjustments and an easing transition adjustment. The first balancing adjustment uses a histogram to remap the pixels in the mosaic to a normal distribution. The second balancing adjustment minimizes transitions between adjacent individual images in the mosaic based on pixels positions of edge pixels and intensity differences between edge pixels in the adjacent images. The easing transitions adjustment modifies the intensity of a target pixel as a function of a radius from the target pixel, the distance between the target pixel and a nearest neighbor pixel, and an intensity difference between the nearest neighbor pixel and a pixel adjacent to the nearest neighbor pixel. A revised mosaic image is created as a function of the first balancing adjustment, the second balancing adjustment, and the easing transition adjustment.

20 Claims, 13 Drawing Sheets

(58) Field of Classification Search
CPC . G06T 2207/20216; G06T 2207/20221; G06T 2207/30181; G06T 3/40; G06T 3/4038; G06T 3/4015; G06T 5/20; G06T 5/007; G06T 5/008; G06T 5/009; G06T 7/90; G06T 7/10; G06T 7/11; G06T 7/12; G06T 7/0079; G06T 7/40; G06T 7/0085; G06T 7/0081; G06V 10/50; G06V 10/507; G06V 10/758; G06V 10/759; G06V 20/10; G06V 20/13; H04N 1/4072; H04N 1/4074; H04N 5/235; H04N 5/2351; H04N 1/40; H04N 1/40062; H04N 1/407; H04N 1/409; H04N 1/4092; H04N 1/60; H04N 1/6027; H04N 5/341

See application file for complete search history.

(56) References Cited

U.S. PATENT DOCUMENTS

| | | | |
|---|---|---|---|
| 6,694,064 B1* | 2/2004 | Benkelman | G06V 20/13 382/284 |
| 6,757,445 B1 | 6/2004 | Knopp | |
| 7,149,366 B1 | 12/2006 | Sun | |
| 8,879,813 B1 | 11/2014 | Solanki et al. | |
| 10,410,321 B2 | 9/2019 | Ilic et al. | |
| 10,419,669 B2 | 9/2019 | Hornung et al. | |
| 10,708,491 B2 | 7/2020 | Ilic et al. | |
| 10,776,902 B2 | 9/2020 | Bergen et al. | |
| 11,087,532 B2 | 8/2021 | Verret et al. | |
| 2006/0023217 A1* | 2/2006 | Bangalore | G06T 5/50 356/418 |
| 2010/0201682 A1 | 8/2010 | Quan et al. | |
| 2012/0114229 A1 | 5/2012 | Zhou | |
| 2012/0154584 A1 | 6/2012 | Omer et al. | |
| 2012/0170842 A1* | 7/2012 | Liu | G06T 5/50 382/167 |
| 2013/0223758 A1* | 8/2013 | Hou | G06T 5/00 382/274 |
| 2014/0146173 A1 | 5/2014 | Joyce et al. | |
| 2014/0267378 A1* | 9/2014 | Olsen | G06T 5/009 345/617 |
| 2014/0307045 A1* | 10/2014 | Richardt et al. | |
| 2015/0055839 A1* | 2/2015 | Wu | G06T 3/4038 382/131 |
| 2015/0065803 A1 | 3/2015 | Douglas et al. | |
| 2015/0172620 A1* | 6/2015 | Guo | G06T 3/0081 382/284 |
| 2016/0063705 A1* | 3/2016 | Xu | G06T 5/50 382/199 |
| 2016/0306824 A1 | 10/2016 | Lopez et al. | |
| 2018/0342100 A1 | 11/2018 | Mollis | |
| 2019/0281215 A1* | 9/2019 | Chan | G06T 7/90 |
| 2020/0193158 A1 | 6/2020 | Delp et al. | |
| 2020/0327696 A1 | 10/2020 | Habib | |
| 2021/0134055 A1 | 5/2021 | Verret et al. | |
| 2022/0058781 A1* | 2/2022 | Gal | G06T 5/007 |

FOREIGN PATENT DOCUMENTS

| | | | |
|---|---|---|---|
| CN | 108257092 A * | 7/2018 | |
| CN | 109996072 A * | 7/2019 | G06T 3/40 |
| CN | 114092384 A * | 2/2022 | |
| CN | 114223209 A * | 3/2022 | G06T 5/009 |
| EP | 3002729 A1 | 4/2016 | |
| JP | 2014052702 A * | 3/2014 | |
| WO | WO-2004057531 A1 * | 7/2004 | G06T 5/009 |
| WO | WO-2022216818 A1 | 10/2022 | |

OTHER PUBLICATIONS

"SOCET GXP v4.4", BAE Systems, [Online]. Retrieved from the Internet: <URL: https://www.geospatialexploitationproducts.com/content/socet-gxp/>, (Accessed Nov. 19, 2019), 3 pages.

"International Application Serial No. PCT/US2022/023664, International Search Report dated Aug. 19, 2022", 5 pgs.

"International Application Serial No. PCT/US2022/023664, Written Opinion dated Aug. 19, 2022", 7 pgs.

Szeliski, Richard, "Image Alignment and Stitching: A tutorial", Internet Citation, [Online] Retrieved from the internet: <http://pages.cs.wisc.edu/-dyer/ai-qual/szeliski-tr06.pdf>, (Dec. 10, 2006), 89 pgs.

* cited by examiner

| T1 | T2 | T3 | T4 | T5 | N |
|----|----|----|----|----|----|
| T6 | T7 | T8 | T9 | T10 | T31 |
| T11 | T12 | T13 | T14 | T15 | T32 |
| T16 | T17 | T18 | T19 | T20 | T33 |
| T21 | T22 | T23 | T24 | T25 | T34 |
| T26 | T27 | T28 | T29 | T30 | T35 |

Fig. 9

```
                                    ┌──────────────────────────┐
                                    │ THE CREATING THE         │
                                    │ HISTOGRAM, THE           │
                                    │ REMAPPING THE HISTOGRAM, │
                                    │ AND THE ADJUSTING THE    │──1026A
                                    │ INTENSITIES FOR THE      │
                                    │ PIXELS IN THE INDIVIDUAL │
                                    │ IMAGE CAN BE EXECUTED    │
                                    │ IN A PARALLEL,           │
                                    │ MULTI-THREADED MANNER    │
                                    │ FOR A PLURALITY OF       │
                                    │ INDIVIDUAL IMAGES        │
                                    └──────────────────────────┘
```

1026 — ADJUST THE INTENSITIES FOR THE PIXELS IN THE INDIVIDUAL IMAGE AS A FUNCTION OF THE REVISED INTENSITIES

1024B — THE FIRST BIT PER PIXEL FORMAT IS A 12 BIT PER PIXEL FORMAT AND THE SECOND BIT PER PIXEL FORMAT IS AN 8 BIT PER PIXEL FORMAT

1034 — CALCULATE MINIMIZATION COEFFICIENTS THAT REPRESENT A RELATIONSHIP BETWEEN THE FIRST MATRIX AND THE SECOND MATRIX

1034A — CALCULATE THE MINIMIZATION COEFFICIENTS USING A LEAST SQUARES ALGORITHM

1033 — GENERATE A SECOND MATRIX INCLUDING THE MINIMUM DELTA INTENSITIES

*Fig. 10B*

```
                                                    ┌─ 1046C
                                                    │
                                        ┌───────────────────────────┐
                                        │  ADJUST THE INTENSITY OF A FIRST TARGET PIXEL
                                        │  THAT IS NEARER TO AN EDGE OF THE INDIVIDUAL
                                        │  IMAGE TO A GREATER MAGNITUDE THAN A SECOND
                                        │  TARGET PIXEL THAT IS FARTHER FROM THE EDGE OF
                                        │  THE INDIVIDUAL IMAGE
                                        └───────────────────────────┘
┌─ 1046A                                              │
│                                                     │
┌─────────────────────────────────────┐               │
│ THE DETERMINING MINIMUM DELTA INTENSITIES          │
│ BETWEEN EDGE PIXELS IN THE INDIVIDUAL IMAGE AND    │
│ NEIGHBORING PIXELS IN AN ADJACENT INDIVIDUAL       │
│ IMAGE, THE GENERATING A FIRST MATRIX COMPRISING    │
│ PIXEL POSITIONS OF THE EDGE PIXELS, THE            │
│ GENERATING A SECOND MATRIX COMPRISING THE          │
│ MINIMUM DELTA INTENSITIES, THE CALCULATING         │
│ MINIMIZATION COEFFICIENTS THAT REPRESENT A         │
│ RELATIONSHIP BETWEEN THE FIRST MATRIX AND THE      │
│ SECOND MATRIX, AND THE ADJUSTING THE INTENSITIES   │
│ FOR THE PIXELS IN THE INDIVIDUAL IMAGE AS A        │
│ FUNCTION OF THE MINIMIZATION COEFFICIENTS ARE      │
│ EXECUTED IN A PARALLEL, MULTI-THREADED MANNER      │
│ FOR A PLURALITY OF INDIVIDUAL IMAGES               │
└─────────────────────────────────────┘
                                    │
                            ┌─ 1046 │
                    ┌───────────────────────────┐
                    │ ADJUST THE INTENSITY OF THE TARGET PIXEL AS A
                    │ FUNCTION OF THE RADIUS, THE DISTANCE BETWEEN
                    │ THE TARGET PIXEL AND THE NEAREST NEIGHBOR
                    │ PIXEL, AND THE DELTA INTENSITY
                    └───────────────────────────┘
                                    │
                                   (F)
```

Fig. 10E

MITIGATING TRANSITIONS IN MOSAIC IMAGES

GOVERNMENT LICENSE RIGHTS

This invention was made with government support under contract numbers HM157518D0009/HM157519F0105. The U.S. government has certain rights in the invention.

TECHNICAL FIELD

Embodiments described herein generally relate to mitigating transitions in mosaic images.

BACKGROUND

In some applications relating to mosaic images, such as in satellite imagery, images are captured in a 12 bit per pixel format, but then these images are displayed on devices in an 8 bit per pixel format. The display of a 12 bit per pixel format on an 8 bit per pixel device causes a decrease in quality of the mosaic image. Additionally, in mosaic images, there are differing contrasts between adjacent individual images that result in harsh transitions among the individual images.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 9 is an example pixel diagram used in connection with the ramping transition process of FIG. 6.

FIGS. 10A, 10B, 10C, 10D, and 10E are a detailed block diagram of a combined normalized balancing, least squares balancing, and ramp transitioning processes for a mosaic image.

DETAILED DESCRIPTION

Figure 1:
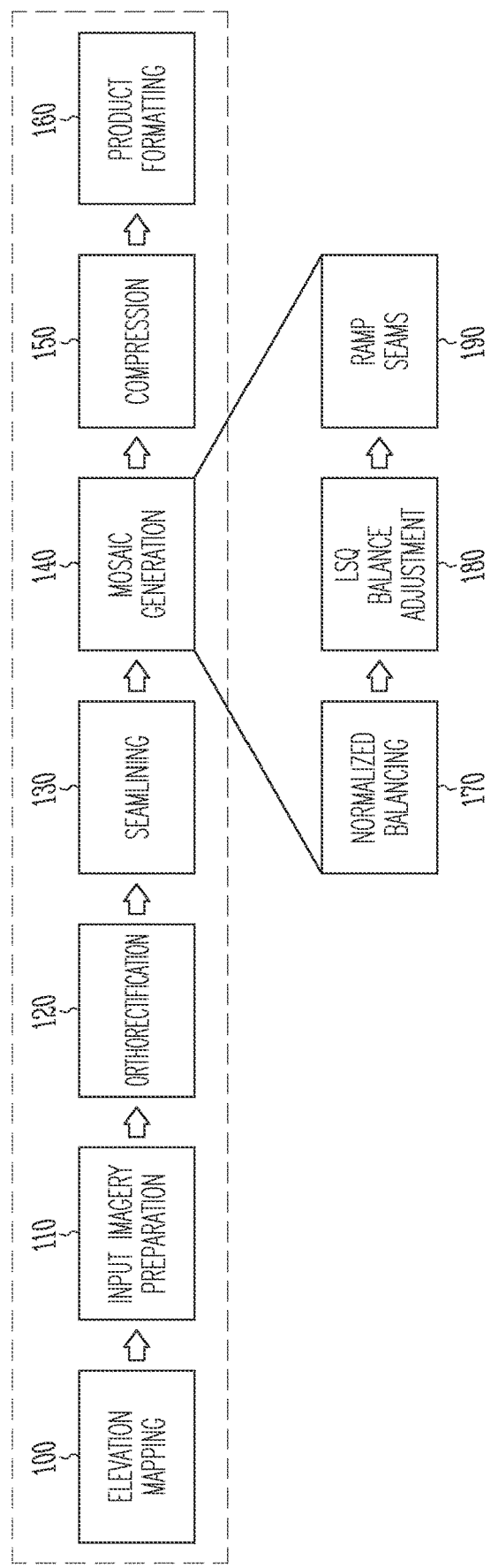
FIG. 1 is a high-level block diagram of a process for generating a mosaic image.

FIG. 1 is a high-level block diagram of a process for generating a mosaic image. An elevation mapping at 110 begins the process. The elevation mapping 110 captures and records the elevations of the points of interest in an area of interest (in a satellite imagery application). At 110, an image is captured, and at 120, the image is orthorectified. Individual images are then seamlined at 130 to generate a mosaic image at 140. In prior systems, that is, systems without the benefits of the embodiments of the present disclosure, the image is then compressed at 150, and formatted at 160 for later display. In one or more embodiments, before the image is compressed and formatted, the image is subjected to a normalized balancing process at 170, a least squares balancing adjustment at 180, and a ramp seaming at 190.

Figure 2B:
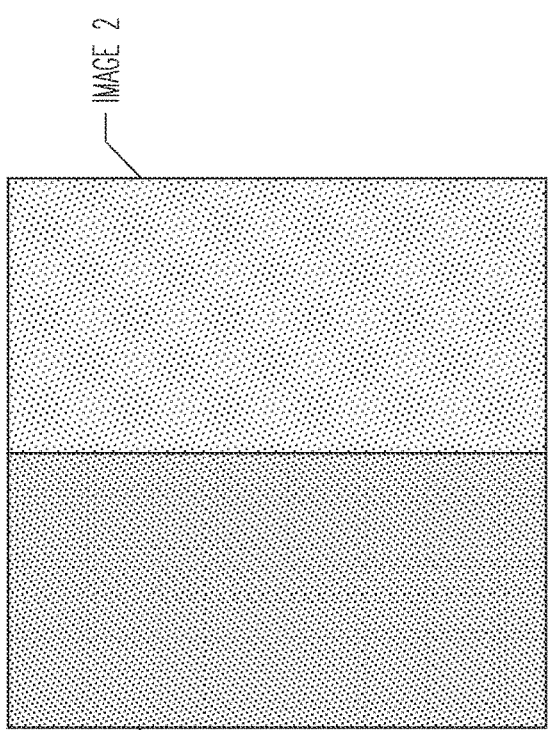
FIGS. 2A and 2B illustrate transitions between individual images in a mosaic image before and after a balancing process.
Figure 2A:
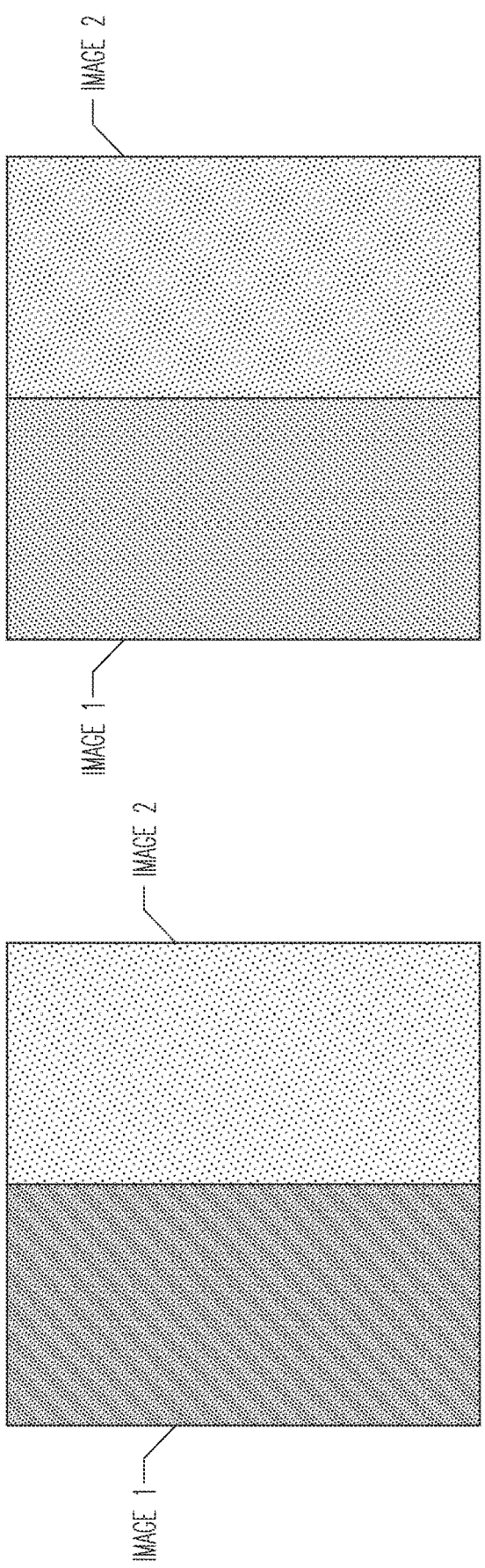

When creating a mosaic image as in FIG. 1, without the benefits of the normalized balancing process at 170, the least squares balancing adjustment at 180, and the ramp seaming at 190, there are occasionally places where the transitions from one individual image to an adjacent individual image are more noticeable than others. This situation is illustrated in FIG. 2A. There are many different reasons for this, for example, differing sun effects (shadows, reflections, etc.), seasonal differences, clouds, etc. Sometimes balancing algorithms don't fully reduce all transitions between adjacent images. However, by using one or more of the normalized balancing process 170, the least squares balancing adjustment 180, and the ramp seaming 190, a more balanced mosaic image can be created as illustrated in FIG. 2B.

Figure 3:
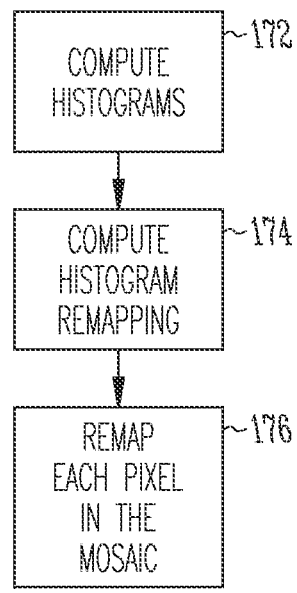
FIG. 3 is a high-level block diagram of a normalized balancing process for a mosaic image.

In the normalized balancing process 170, at the highest level, as illustrated in FIG. 3, histograms are computed at 172, the histograms are remapped at 174, and using the remapped histograms, each pixel is remapped into the mosaic at 176. A histogram is created for each individual image in the mosaic. Each histogram is then remapped to a predetermined normal distribution to create an 8 bits per pixel balanced mosaic. The result of this remapping is that each individual image has similar tonal qualities.

More specifically, operations 172, 174, and 176 include the following. As the pixels are placed into the mosaic, a histogram is created for each image individually. In an embodiment, the input images are 12 bits per pixel bit (bpp) depth, but the display of the imagery is 8 bits per pixel (bpp) depth (and then compressed). The histograms for the individual images allow for a mapping from the 12 bpp space (0-4095) to the 8 bpp space (1-255 with 0 being reserved for an unfilled pixel). A normal distribution is created for the 8 bpp space with a mean of 128 and a standard deviation of 43.33 (127/3). These numbers are used in an embodiment because 128 is exactly halfway across the range 1-255 (the desired target mean). The standard deviation is set to ⅓ of the distance from the midpoint to either end. The use of three standard deviations (sigma) provides a number that guarantees that 99.7% of the values in a normal distribution are considered. Using this normal distribution, a 12 bpp value from its percentile location in the 12 bpp histogram is mapped to the same percentile location in the 8 bpp histogram. For example, if a 12 bpp pixel value is in the 37% position, then it gets mapped to the 8 bpp value that is 37% along the 8 bpp normal distribution. The entire image is remapped in this manner.

Figure 7:
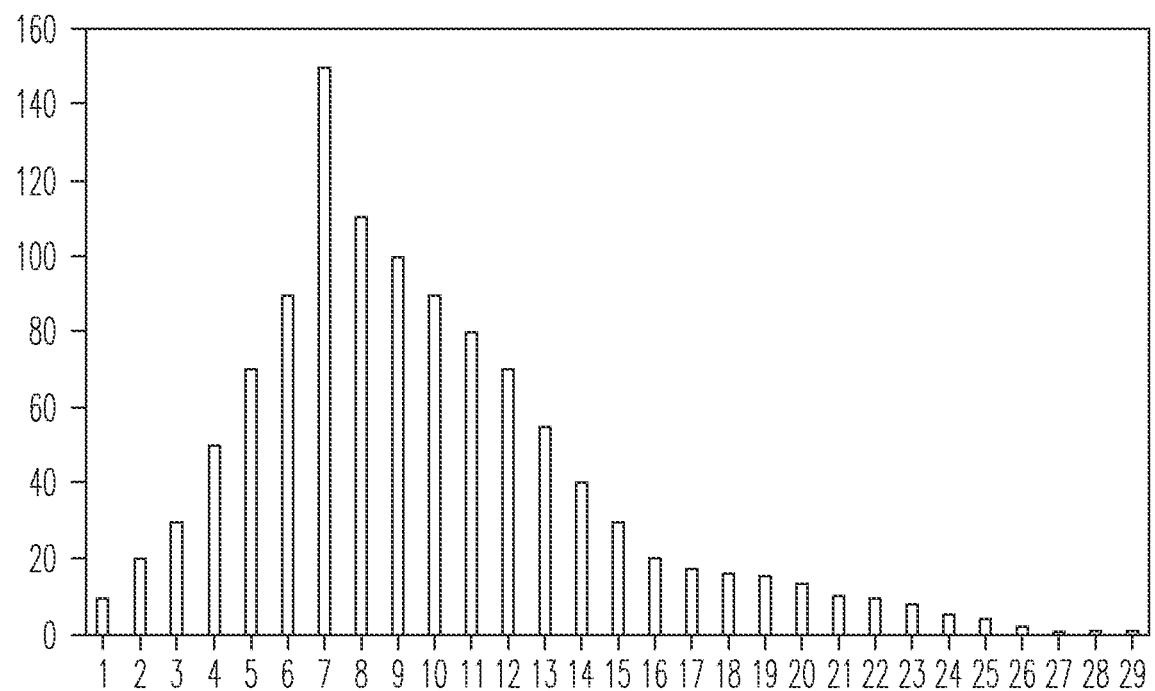
FIG. 7 is an example histogram used in a normalized balancing process for a mosaic image.
Figure 8:
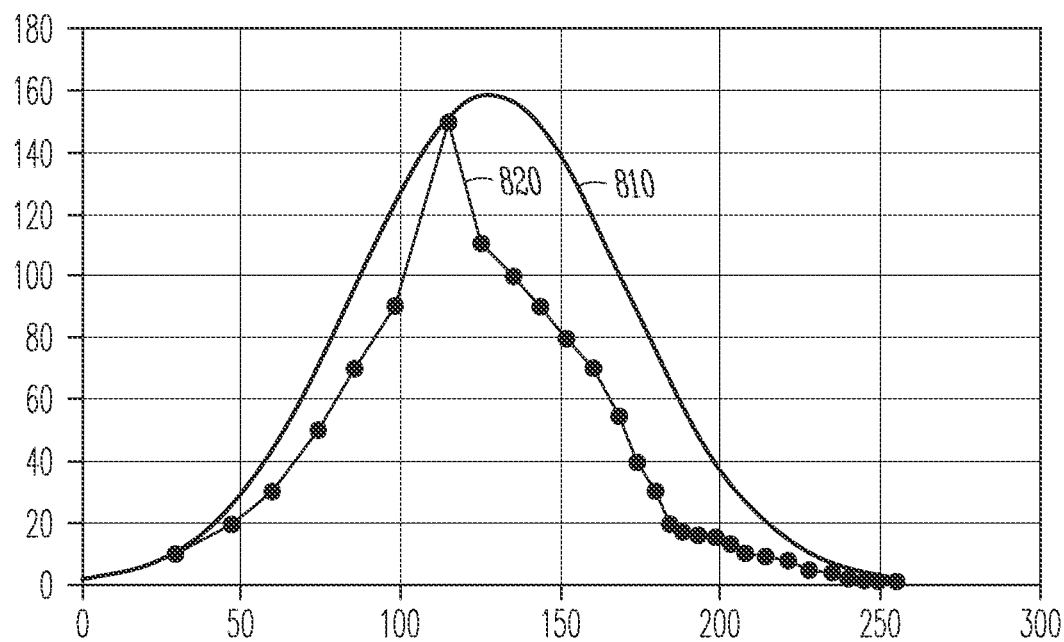
FIG. 8 illustrates a distribution shift for the example histogram of FIG. 7.

FIGS. 7 and 8 illustrate this normal balancing process. FIG. 7 illustrates a histogram for a particular individual image. The histogram represents the number of pixels from the image (the horizontal axis) that have a particular intensity value (the y axis). Using the remapping process of FIG. 3, the distribution illustrated in FIG. 7 would get shifted as illustrated in FIG. 8. In FIG. 8, the line 810 has been scaled up for comparison purposes. It assumes a continuous distribution across the full range of values, but as seen in FIG. 7, the input only has 29 distinct values. Line 810 is the target normal distribution and line 820 is the original distribution shifted into the appropriate positions on the 8 bpp scale. The small number of bins in the example of FIG. 7 doesn't fully illustrate the way that the mapping functions. The halfway point of the original distribution occurs in bin #9. This causes bin #8 to map to a value just to the left of the center of the line 810 and bin #9 to map to a value just to the right of the line 810. If there were many more than 255 bins, it could be seen that some of the bins get combined and there would be a smoother correlation between lines 810 and 820.

In a satellite image situation, a typical mosaic is comprised of dozens of individual images with potentially varying cloud content and varying times of day. In the creation of this mosaic, there is also a mosaic map file created that tells which image each pixel came from. One of the manual steps is to remove as many clouds as possible but there are still occasions where it is not possible to remove them all. A cloud is not something that would persist between adjacent images. Different times of day can cause objects or areas that are reflective to have varying brightness from one image to the next. This causes scene variations where there are large amounts of water, snow, sand, etc. This is where the least squares adjustment algorithm 180 comes in to play.

Figure 4:
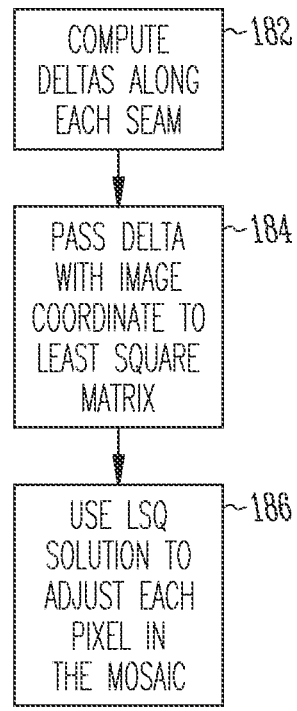
FIG. 4 is a high-level block diagram of a least square balancing process for a mosaic image.

Referring to FIG. 4, at a high level, the least squares balancing method 180 includes the operations of computing delta intensity differences between seams of the individual images (182), providing pixel positions and delta intensity differences to least square matrices (184), and using solutions from the least square matrices to the pixels in the mosaic image (186).

After the mosaic is created and normally balanced at 170, the seam areas of the mosaic image are analyzed to determine a delta value for each pixel pair on adjacent sides of the seam. The image row and column positions along with the delta value are used to fill a matrix respectively, and each matrix is then solved with a least squares algorithm (one solution per image in the mosaic) as described below. The matrix solutions are used to compute a pixel adjustment at each point in the mosaic.

Ultimately, the goal of the least squares adjustment 180 is to apply an adjustment to each pixel in each image based on the pixel row and column within the image. For every pixel along the outer edge of a given individual image within the mosaic, the smallest difference between this given individual image and any neighboring pixel from a different image is calculated. The image position (x, y) and half the pixel delta (D) are then each entered into a respective matrix that contains every edge pixel for the current individual image. Half of the pixel delta is used so that, ideally, each individual image will move half the distance to each of its neighbors. The point is to find the solution of the following matrix:

$$\begin{bmatrix} x_1 & y_1 & 1 \\ \vdots & \vdots & \vdots \\ x_n & y_n & 1 \end{bmatrix} \begin{bmatrix} A \\ B \\ C \end{bmatrix} = \begin{bmatrix} D_1 \\ \vdots \\ D_n \end{bmatrix}$$

This is the least squares way of find the generic solution of Ax+By+C=D

The standard way of solving this for A, B, and C is used. Multiply on the left by the transpose of the x/y matrix.

$$\begin{bmatrix} x_1 & \cdots & x_n \\ y_1 & \cdots & y_n \\ 1 & \cdots & 1 \end{bmatrix} \begin{bmatrix} x_1 & y_1 & 1 \\ \vdots & \vdots & \vdots \\ x_n & y_n & 1 \end{bmatrix} \begin{bmatrix} A \\ B \\ C \end{bmatrix} = \begin{bmatrix} x_1 & \cdots & x_n \\ y_1 & \cdots & y_n \\ 1 & \cdots & 1 \end{bmatrix} \begin{bmatrix} D_1 \\ \vdots \\ D_n \end{bmatrix}$$

This then gives the equation:

$$\begin{bmatrix} \sum_1^n x_i^2 & \sum_1^n x_i y_i & \sum_1^n x_i \\ \sum_1^n x_i y_i & \sum_1^n y_i^2 & \sum_1^n y_i \\ \sum_1^n x_i & \sum_1^n y_i & n \end{bmatrix} \begin{bmatrix} A \\ B \\ C \end{bmatrix} = \begin{bmatrix} \sum_1^n x_i D_i \\ \sum_1^n y_i D_i \\ \sum_1^n D_i \end{bmatrix}$$

Thereafter, multiplying on the left by the inverse of the leftmost matrix gives A and B. Once this pair of coefficients for each image is calculated, the adjustment is then calculated to add for any given pixel using its image coordinate to solve Ax+By+C=D. Each pixel in the mosaic is adjusted by the appropriate amount and a new mosaic is created.

Figure 5:
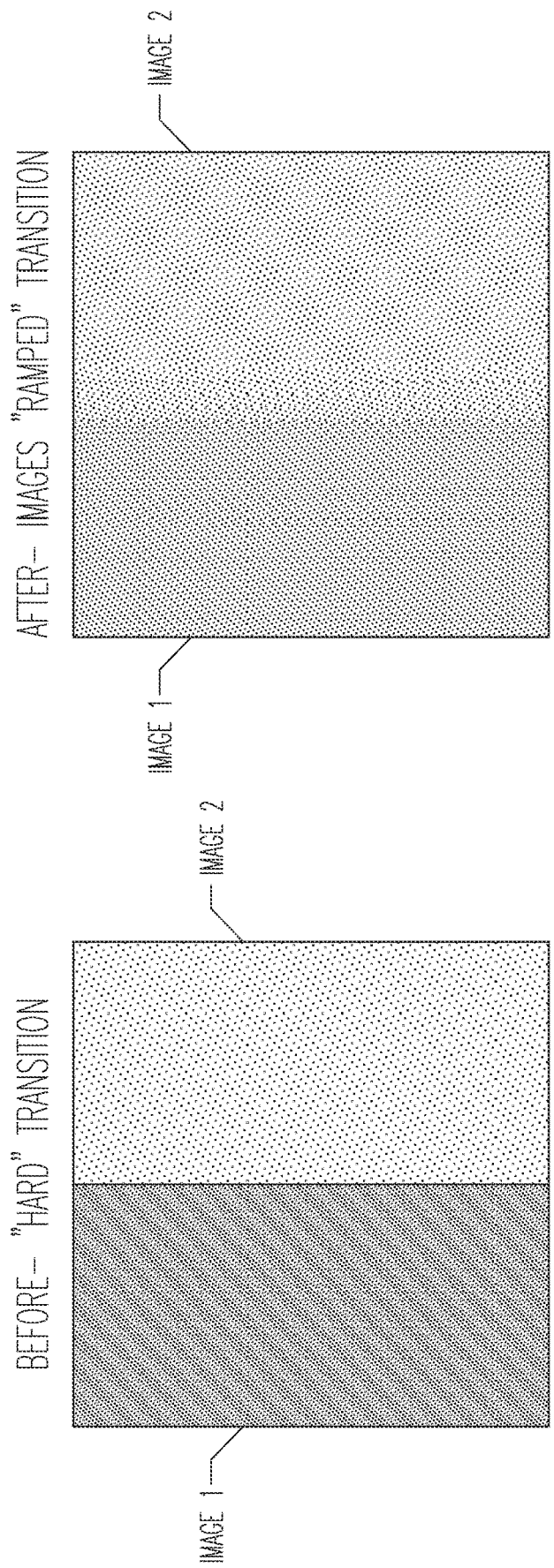
FIGS. 5A and 5B illustrate transitions between individual images in a mosaic image before and after a ramped transition process.

As noted above, when creating mosaics using individual images from multiple sources, there are occasionally places where the transitions from one image to the next are more noticeable than others. FIG. 5A illustrates an example of a "hard" transition between two adjacent individual images in a mosaic image, and FIG. 5B illustrates a smoothed or ramped transition between those same two individual images after the application of the ramping processing 190.

Figure 6:
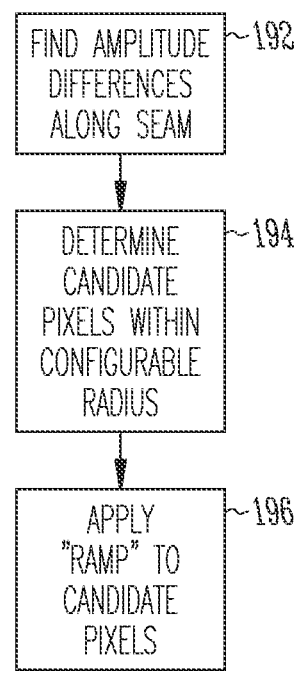
FIG. 6 is a high-level block diagram of a ramping transition process for a mosaic image.

FIG. 6 illustrates the ramping process at a high level. At 192, amplitude differences are found along a seam of two adjacent individual images in the mosaic image. At 194, candidate pixels within a certain radius of a target pixel are identified, and at 196, as discussed in more detail below, a ramp process is applied to the candidate pixels.

Ultimately and specifically, the goal of the ramping process 190 is to blend the brightness of two adjacent individual images within a specified radius (R) of the edge between the adjacent individual images. For every pixel in the mosaic, referred to as the target pixel, a search is conducted for a pixel from a different source image within the radius R. If there are none, then the target pixel at issue will not change. If there are pixels from another image within the radius R, a pixel that is nearest to the target pixel is determined. This is referred to as the neighbor pixel. At this point, two numbers are calculated. One is the distance (D) from the target pixel to the neighbor pixel. The other number is half of the pixel delta (P) between the neighbor pixel and the pixel that is adjacent to the neighbor pixel, from the same image as the target pixel, and that lies in a line between the target pixel and the neighbor pixel. The adjustment to be applied to the target pixel is then calculated as P*(R+1−D)/(R+1). This value is then be added back into the target pixel.

FIG. 9 illustrates an example of the pixels to consider in the ramp process. All of the pixels with a TX or TXX identifier are from the target image and the pixel with the N identifier is from a neighbor image. For these examples, a radius of 5 is assumed. Considering the target pixel T1, its distance from N is 5. The pixel delta would be (N−T5). The adjustment to make at T1 would be (N−T5)*(6−5)/6. Considering the target pixel T18, its distance from N is 4.24. The pixel delta would be (N−T10). The adjustment to make at T1 would be (N−T10)*(6−4.24)/6. Finally, considering the target pixel T27, its distance from N is 6.40. It is outside the given radius, so it would not be considered for adjustment. Each pixel in the mosaic is adjusted by the appropriate amount and a new mosaic is created.

FIGS. 10A, 10B, 10C, 10D, and 10E illustrate a process to ease transitions among individual images in a mosaic image. FIGS. 10A, 10B, 10C, 10D, and 10E include process, operation, and/or feature blocks 1010-1050. Though arranged substantially serially in the example of FIGS. 10A, 10B, 10C, 10D, and 10E, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 10A, 10B, 10C, 10D, and 10E, at 1010, a mosaic image is received into a computer processor. The mosaic image is subject to one or more adjustments to improve the quality of the mosaic image, especially at the edges of the individual images of the mosaic image. As noted above, these processes can be referred to as a normal balance adjustment, a least squares balancing adjustment, and a ramping adjustment.

The normal balancing adjustment 1020 is disclosed in operations 1020-1026. At 1022, a histogram for an individual image in the mosaic image is created. The histogram includes intensities for pixels in the individual image. At 1024, the histogram is remapped to a normal distribution. This remapping generates revised intensities for the pixels in the individual image. As indicated at 1024A, the remapping is a remapping from a first bit per pixel format to a second bit per pixel format. This remapping equalizes the tonal quality of the mosaic image. As 1024B, in an embodiment, the first bit per pixel format is a 12 bit per pixel format and the second bit per pixel format is an 8 bit per pixel format. As indicated at 1024D, the normal distribution can be adjusted to an alternate distribution, and the histogram can be remapped to the alternate distribution. At 1026, the intensities for the pixels in the individual image are adjusted as a function of the revised intensities. The details of this adjustment are disclosed above in connection with FIGS. 7 and 8. As indcted at 1026A, the creating the histogram, the remapping the histogram, and the adjusting the intensities for the pixels in the individual image can be executed in a parallel, multi-threaded manner for a plurality of individual images.

The least squares balancing adjustment 1030 is disclosed in operations 1030-1035. At 1031, minimum delta intensities between edge pixels in the individual image and neighboring pixels in an adjacent individual image are determined. At 1032, a first matrix including pixel positions of edge pixels of individual images in the mosaic is generated. At 1033, a second matrix including the minimum delta intensities is generated. At 1034, minimization coefficients that represent a relationship between the first matrix and the second matrix are calculated. As indicated at 1034A, in an embodiment, the minimization coefficients are calculated using a least squares algorithm. At 1035, the intensities for the pixels in the individual image are adjusted as a function of the minimization coefficients. As indicated at 1035A, the selecting the target pixel in the individual image, the identifying candidate pixels in the adjacent individual image, the selecting a nearest neighbor pixel from the candidate pixels, the calculating the distance from the target pixel to the nearest neighbor pixel, the calculating the delta intensity, and the adjusting the intensity of the target pixel are executed in a parallel, multi-thread manner for a plurality of individual images.

The easing transitions adjustment 1040 is disclosed in operations 1040-4046. At 1041, a target pixel in an individual image is selected. At 1042, candidate pixels are selected in the adjacent individual image that are located within a certain radius of the target pixel. If no candidate pixels are identified for a particular target pixel, then the intensity of that particular target pixel is not changed (1042A). At 1043, a nearest neighbor pixel is selected from the candidate pixels. At 1044, a distance from the target pixel to the nearest neighbor pixel is calculated. At 1045, a delta intensity including an intensity difference between the nearest neighbor pixel and a pixel adjacent to the nearest neighbor pixel is calculated. The pixel adjacent to the nearest neighbor pixel is located within the individual image that includes the target pixel and that is on a line between the target pixel and the nearest neighbor pixel. At 1046, the intensity of the target pixel is adjusted as a function of the radius, the distance between the target pixel and the nearest neighbor pixel, and the delta intensity. The details of this adjustment are disclosed above in connection with FIG. 9. As indicated at 1046A, the determining minimum delta intensities between edge pixels in the individual image and neighboring pixels in an adjacent individual image, the generating a first matrix comprising pixel positions of the edge pixels, the generating a second matrix comprising the minimum delta intensities, the calculating minimization coefficients that represent a relationship between the first matrix and the second matrix, and the adjusting the intensities for the pixels in the individual image as a function of the minimization coefficients are executed in a parallel, multi-threaded manner for a plurality of individual images. As indicated at 1046C, the adjustment to the intensity of the target pixel adjusts the intensity of a first target pixel that is nearer to an edge of the individual image to a greater magnitude than a second target pixel that is farther from the edge of the individual image. As indicated at 1046E, the easing transitions adjustment and the least squares balancing adjustment are reversible. That is, the original intensity value of a pixel can be retrieved, and in this manner can be thought of as non-destructive to the original pixel intensity.

At 1050, a revised mosaic image is created as a function of the first balancing adjustment, the second balancing adjustment, and the easing transitions.

Figure 10A:
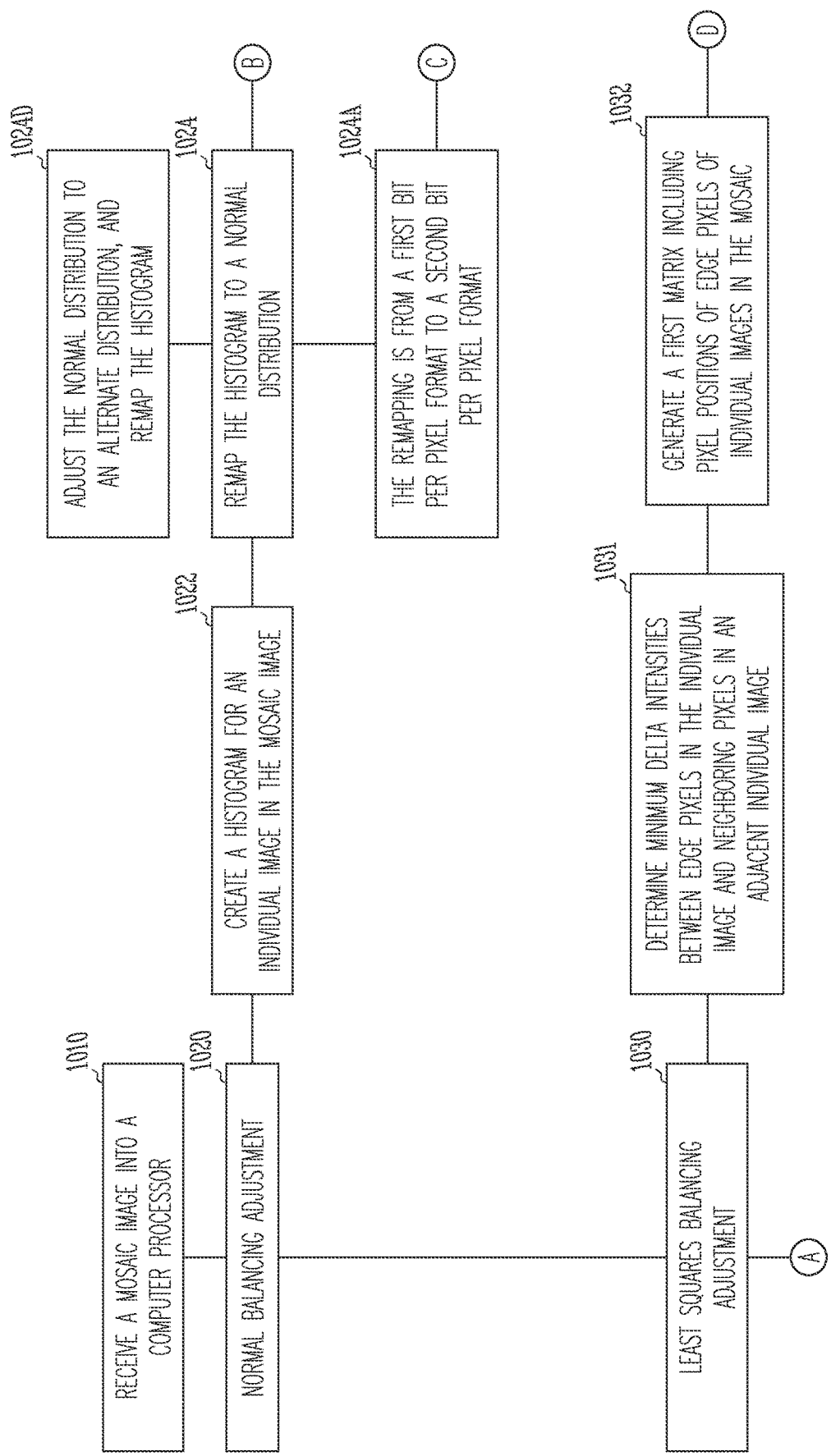
Figure 10C:
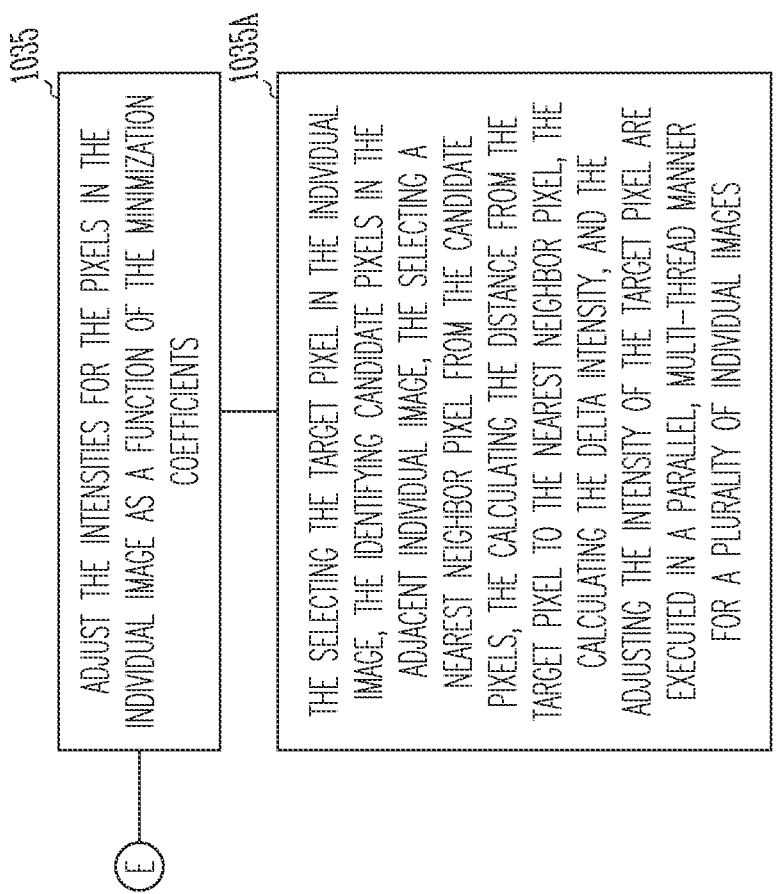
Figure 10D:
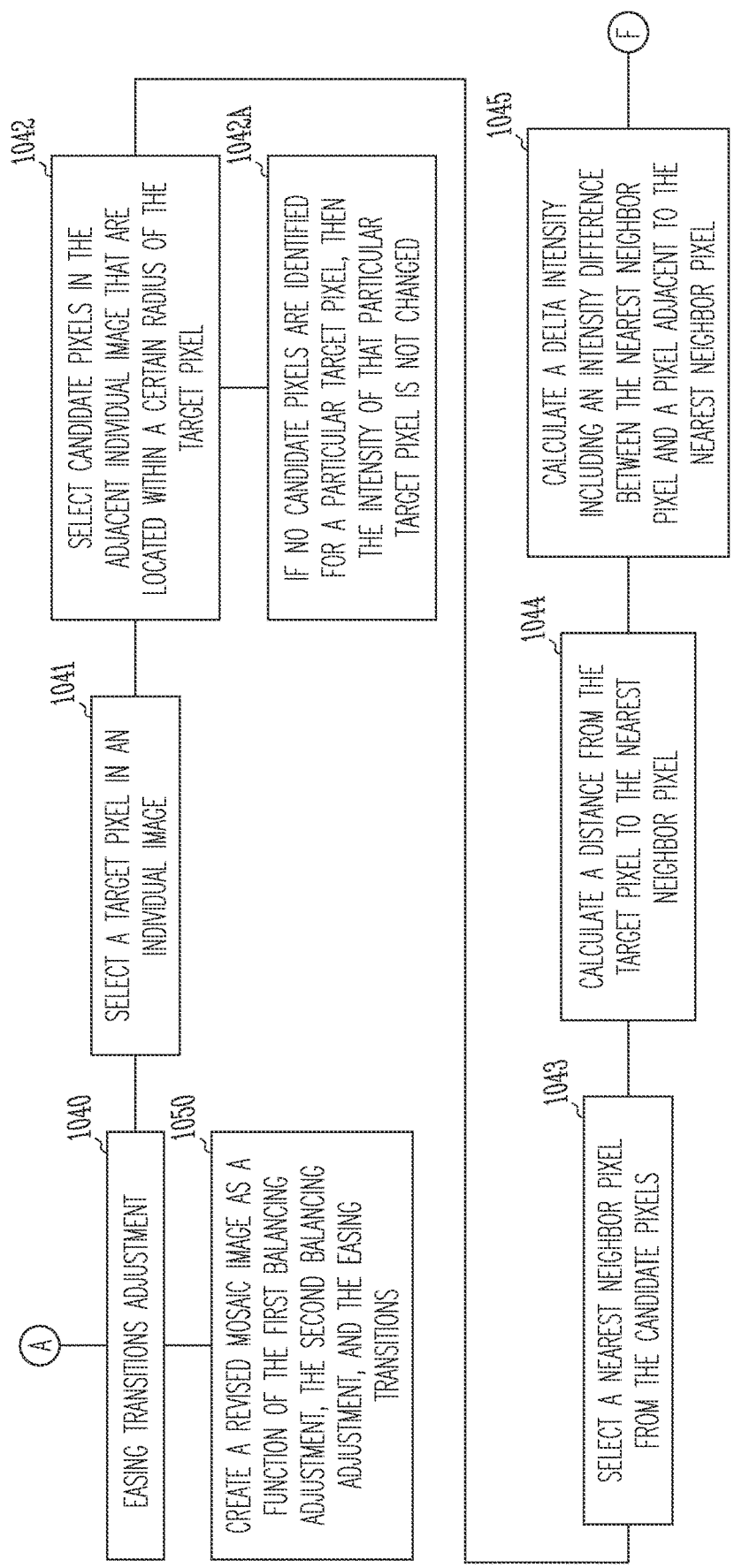
Figure 11:
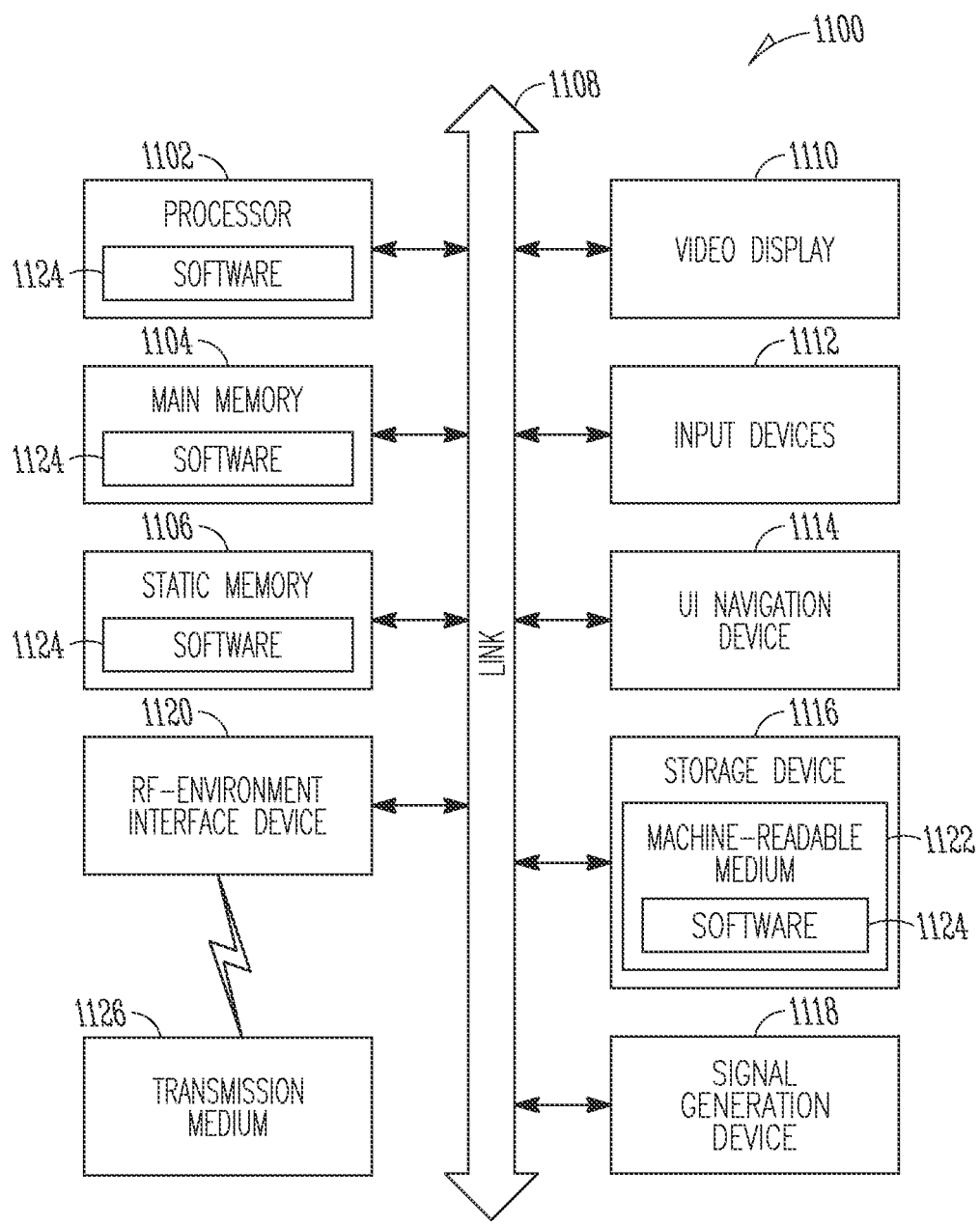
FIG. 11 is a block diagram of a computer architecture upon which one of more of the disclosed embodiments can execute.

FIG. 11 is a block diagram illustrating a computing and communications platform 1100 in the example form of a general-purpose machine on which some or all the operations of FIGS. 10A and 10B may be carried out according to various embodiments. In certain embodiments, programming of the computing platform 1100 according to one or more particular algorithms produces a special-purpose machine upon execution of that programming. In a networked deployment, the computing platform 1100 may operate in the capacity of either a server or a client machine in server-client network environments, or it may act as a peer machine in peer-to-peer (or distributed) network environments.

Example computing platform 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computing platform 1100 may further include a video display unit 1110, input devices 1112 (e.g., a keyboard, camera, microphone), and a user interface (UI) navigation device 1114 (e.g., mouse, touchscreen). The computing platform 1100 may additionally include a storage device 1116 (e.g., a drive unit), a signal generation device 1118 (e.g., a speaker), and a RF-environment interface device (RFEID) 1120.

The storage device 1116 includes a non-transitory machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computing platform 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 1120 includes radio receiver circuitry, along with analog-to-digital conversion circuitry, and interface circuitry to communicate via link 1108 according to various embodiments. Various form factors are contemplated for RFEID 1120. For instance, RFEID may be in the form of a wideband radio receiver, or scanning radio receiver, that interfaces with processor 1102 via link 1108. In one example, link 1108 includes a PCI Express (PCIe) bus, including a slot into which the NIC form-factor may removably engage. In another embodiment, RFEID 1120 includes circuitry laid out on a motherboard together with local link circuitry, processor interface circuitry, other input/output circuitry, memory circuitry, storage device and peripheral controller circuitry, and the like. In another embodiment, RFEID 1120 is a peripheral that interfaces with link 1108 via a peripheral input/output port such as a universal serial bus (USB) port. RFEID 1120 receives RF emissions over wireless transmission medium 1126. RFEID 1120 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For or example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
  receiving into a computer processor a mosaic image;
  executing a first balancing adjustment to the mosaic image, the first balancing adjustment comprising:
    creating a histogram for an individual image in the mosaic image, the histogram comprising intensities for pixels in the individual image;
    remapping the histogram to a normal distribution to generate revised intensities for the pixels in the individual image; and
    adjusting the intensities for the pixels in the individual image as a function of the revised intensities;
  executing a second balancing adjustment to the mosaic image, the second balancing adjustment comprising:
    determining minimum delta intensities between edge pixels in the individual image and neighboring pixels in an adjacent individual image;
    generating a first matrix comprising pixel positions of the edge pixels;
    generating a second matrix comprising the minimum delta intensities;

calculating minimization coefficients that represent a relationship between the first matrix and the second matrix; and adjusting the intensities for the pixels in the individual image as a function of the minimization coefficients;

easing transitions between the individual image and the adjacent individual image, the easing transitions comprising:

selecting a target pixel in the individual image;

identifying candidate pixels in the adjacent individual image that are located within a certain radius of the target pixel;

selecting a nearest neighbor pixel from the candidate pixels;

calculating a distance from the target pixel to the nearest neighbor pixel;

calculating a delta intensity comprising an intensity difference between the nearest neighbor pixel and a pixel adjacent to the nearest neighbor pixel, the pixel adjacent to the nearest neighbor pixel located within the individual image and on a line between the target pixel and the nearest neighbor pixel; and adjusting an intensity of the target pixel as a function of the radius, the distance between the target pixel and the nearest neighbor pixel, and the delta intensity; and creating a revised mosaic image as a function of the first balancing adjustment, the second balancing adjustment, and the easing transitions.

2. The process of claim 1, wherein the remapping comprises a remapping from a first bit per pixel format to a second bit per pixel format.

3. The process of claim 2, wherein the first bit per pixel format comprises a 12 bit per pixel format and the second bit per pixel format comprises an 8 bit per pixel format.

4. The process of claim 1, comprising maintaining the intensity of the target pixel when no candidate pixels are identified.

5. The process of claim 1, comprising adjusting the normal distribution to an alternate distribution; and
remapping the histogram to the alternate distribution.

6. The process of claim 1, wherein the creating the histogram, the remapping the histogram, and the adjusting the intensities for the pixels in the individual image are executed in a parallel, multi-threaded manner for a plurality of individual images.

7. The process of claim 1, wherein the determining minimum delta intensities between edge pixels in the individual image and neighboring pixels in an adjacent individual image, the generating a first matrix comprising pixel positions of the edge pixels, the generating a second matrix comprising the minimum delta intensities, the calculating minimization coefficients that represent a relationship between the first matrix and the second matrix, and the adjusting the intensities for the pixels in the individual image as a function of the minimization coefficients are executed in a parallel, multi-threaded manner for a plurality of individual images.

8. The process of claim 1, wherein the selecting the target pixel in the individual image, the identifying candidate pixels in the adjacent individual image, the selecting a nearest neighbor pixel from the candidate pixels, the calculating the distance from the target pixel to the nearest neighbor pixel, the calculating the delta intensity, and the adjusting the intensity of the target pixel are executed in a parallel, multi-thread manner for a plurality of individual images.

9. The process of claim 1, wherein the minimization coefficients used to calculate the delta intensities are calculated using a least squares algorithm.

10. The process of claim 1, wherein the adjusting the intensity of the target pixel adjusts the intensity of a first target pixel that is nearer to an edge of the individual image to a greater magnitude than a second target pixel that is farther from the edge of the individual image.

11. The process of claim 1, wherein the second balancing adjustment and the easing transitions are reversible.

12. A non-transitory computer-readable medium comprising instructions that when executed by a processor execute a process comprising:

receiving into a computer processor a mosaic image;

executing a first balancing adjustment to the mosaic image, the first balancing adjustment comprising:

creating a histogram for an individual image in the mosaic image, the histogram comprising intensities for pixels in the individual image;

remapping the histogram to a normal distribution to generate revised intensities for the pixels in the individual image; and adjusting the intensities for the pixels in the individual image as a function of the revised intensities:

executing a second balancing adjustment to the mosaic image, the second balancing adjustment comprising:

determining minimum delta intensities between edge pixels in the individual image and neighboring pixels in an adjacent individual image;

generating a first matrix comprising pixel positions of the edge pixels;

generating a second matrix comprising the minimum delta intensities;

calculating minimization coefficients that represent a relationship between the first matrix and the second matrix; and adjusting the intensities for the pixels in the individual image as a function of the minimization coefficients;

easing transitions between the individual image and the adjacent individual image, the easing transitions comprising:

selecting a target pixel in the individual image;

identifying candidate pixels in the adjacent individual image that are located within a certain radius of the target pixel;

selecting a nearest neighbor pixel from the candidate pixels;

calculating a distance from the target pixel to the nearest neighbor pixel;

calculating a delta intensity comprising an intensity difference between the nearest neighbor pixel and a pixel adjacent to the nearest neighbor pixel, the pixel adjacent to the nearest neighbor pixel located within the individual image and on a line between the target pixel and the nearest neighbor pixel; and adjusting an intensity of the target pixel as a function of the radius, the distance between the target pixel and the nearest neighbor pixel, and the delta intensity; and creating a revised mosaic image as a function of the first balancing adjustment, the second balancing adjustment, and the easing transitions.

13. The non-transitory computer-readable medium of claim 12, wherein the remapping comprises a remapping from a first bit per pixel format to a second bit per pixel format; and wherein the first bit per pixel format comprises a 12 bit per pixel format and the second bit per pixel format comprises an 8 bit per pixel format.

14. The non-transitory computer-readable medium of claim 12, comprising instructions for maintaining the intensity of the target pixel when no candidate pixels are identified.

15. The non-transitory computer-readable medium of claim 12, comprising instructions for adjusting the normal distribution to an alternate distribution; and
   remapping the histogram to the alternate distribution.

16. The non-transitory computer-readable medium of claim 12, wherein the creating the histogram, the remapping the histogram, and the adjusting the intensities for the pixels in the individual image are executed in a parallel, multi-threaded manner for a plurality of individual images.

17. The non-transitory computer-readable medium of claim 12, wherein the determining minimum delta intensities between edge pixels in the individual image and neighboring pixels in an adjacent individual image, the generating a first matrix comprising pixel positions of the edge pixels, the generating a second matrix comprising the minimum delta intensities, the calculating minimization coefficients that represent a relationship between the first matrix and the second matrix, and the adjusting the intensities for the pixels in the individual image as a function of the minimization coefficients are executed in a parallel, multi-threaded manner for a plurality of individual images.

18. The non-transitory computer-readable medium of claim 12, wherein the selecting the target pixel in the individual image, the identifying candidate pixels in the adjacent individual image, the selecting a nearest neighbor pixel from the candidate pixels, the calculating the distance from the target pixel to the nearest neighbor pixel, the calculating the delta intensity, and the adjusting the intensity of the target pixel are executed in a parallel, multi-thread manner for a plurality of individual images.

19. The non-transitory computer-readable medium of claim 12, wherein the minimization coefficients used to calculate the delta intensities are calculated using a least squares algorithm.

20. A system comprising:
   a computer processor; and
   a computer memory coupled to the computer processor;
   wherein the computer processor and computer memory are operable for:
   receiving into the computer processor a mosaic image;
   executing a first balancing adjustment to the mosaic image, the first balancing adjustment comprising:
   creating a histogram for an individual image in the mosaic image, the histogram comprising intensities for pixels in the individual image;
   remapping the histogram to a normal distribution to generate revised intensities for the pixels in the individual image; and
   adjusting the intensities for the pixels in the individual image as a function of the revised intensities;
   executing a second balancing adjustment to the mosaic image, the second balancing adjustment comprising:
   determining minimum delta intensities between edge pixels in the individual image and neighboring pixels in an adjacent individual image;
   generating a first matrix comprising pixel positions of the edge pixels;
   generating a second matrix comprising the minimum delta intensities;
   calculating minimization coefficients that represent a relationship between the first matrix and the second matrix; and
   adjusting the intensities for the pixels in the individual image as a function of the minimization coefficients;
   easing transitions between the individual image and the adjacent individual image, the easing transitions comprising:
   selecting a target pixel in the individual image;
   identifying candidate pixels in the adjacent individual image that are located within a certain radius of the target pixel;
   selecting a nearest neighbor pixel from the candidate pixels;
   calculating a distance from the target pixel to the nearest neighbor pixel;
   calculating a delta intensity comprising an intensity difference between the nearest neighbor pixel and a pixel adjacent to the nearest neighbor pixel, the pixel adjacent to the nearest neighbor pixel located within the individual image and on a line between the target pixel and the nearest neighbor pixel; and
   adjusting an intensity of the target pixel as a function of the radius, the distance between the target pixel and the nearest neighbor pixel, and the delta intensity; and
   creating a revised mosaic image as a function of the first balancing adjustment, the second balancing adjustment, and the easing transitions.

\* \* \* \* \*